US006763035B1

(12) United States Patent
Koskelainen et al.

(10) Patent No.: US 6,763,035 B1
(45) Date of Patent: Jul. 13, 2004

(54) METHOD AND DEVICE FOR TRANSMITTING INFORMATION TO THE DVB NETWORK

(75) Inventors: Petri Koskelainen, Tampere (FI); Juha-Pekka Luoma, Tampere (FI)

(73) Assignee: Nokia Technology GmbH, Pforzheim (DE)

( * ) Notice: Subject to any disclaimer, the term of this patent is extended or adjusted under 35 U.S.C. 154(b) by 0 days.

(21) Appl. No.: 09/329,532

(22) Filed: Jun. 10, 1999

(30) Foreign Application Priority Data

Jun. 10, 1998 (FI) .................................................. 981323

(51) Int. Cl.[7] .............................................. H04L 12/66
(52) U.S. Cl. ........................ 370/466; 370/390; 370/401
(58) Field of Search ................................ 709/229, 203, 709/217, 230; 370/486, 487, 351, 390, 466, 401

(56) References Cited

U.S. PATENT DOCUMENTS

| 5,892,535 A |   | 4/1999 | Allen et al. |   |
|---|---|---|---|---|
| 6,032,197 A | * | 2/2000 | Birdwell et al. | 709/247 |
| 6,108,706 A | * | 8/2000 | Birdwell et al. | 709/229 |
| 6,351,467 B1 | * | 2/2002 | Dillon | 370/432 |
| 6,385,647 B1 | * | 5/2002 | Willis et al. | 709/217 |
| 6,430,183 B1 | * | 8/2002 | Satran et al. | 370/389 |

FOREIGN PATENT DOCUMENTS

| EP | 0844766 | 5/1998 |
| WO | 9709827 | 3/1997 |
| WO | 9720413 | 6/1997 |

OTHER PUBLICATIONS

"The RTMW application: bringing multicast audio/video to the Web" M. Shin et al, Computer Networks and ISDN Systems, vol. 30, No. 1–7, Apr. 1, 1998, pp. 685–687.

Database Internet Online, The Internet Engineering Task Force, Request for Comments 2327, Apr. 1998, M. Hand et al, "SDP: Session Description Protocol".

"Satellite Interactive Multimedia: A New Opportunity for Broadcasters" G. Alberica et al; International Broadcasting Convention; Sep. 1997, pp. 18–23.

"ISIS Project: An Open Platform for Multimedia Interactive Services" F. Carducci et al; IEE Colloquium on Eu S Initiatives in Satellite Communications–Fixed and Broadcast, May 9, 1997 pp. 6/1–6/12.

"The Set–Top Box as "Multi–Media Terminal"" by S. Pekowsky et al IEEE Transactions on Consumer Electronics, vol. 44, No. 3, Jun. 1998, pp. 833–840.

"Interactive Digital Video Networks: Lessons from a Commercial Deployment" by K. Rath et al; IEEE Communications Magazine, vol. 35, No. 6, Jun. 1, 1997, pp. 70–74.

\* cited by examiner

Primary Examiner—Kenneth Vanderpuye

(57) ABSTRACT

Information is transmitted to a DVB network (15) as an information stream according to the DVB standards, the information is sent from the information producer (11a) or transmitter to the operator (19) of the DVB network (15) for transmission to the DVB network (15), the information producer (11a) transmits the information to a well-known multicast address in Internet (40) as packets according to the multicast Internet protocol (IP), and an operator (19) receives the multicast IP packets that contain the information from Internet (40). In addition, the invention relates to a device (12) for transmitting information to the DVB network (15), which device (12) has means (41) for receiving the information to be transmitted, means (14) for adding the received information to an information stream to be sent to the DVB network (15) and means (14) for sending the information stream to the DVB network (15) and means (41) for receiving packets according to the multicast Internet protocol.

16 Claims, 5 Drawing Sheets

METHOD AND DEVICE FOR TRANSMITTING INFORMATION TO THE DVB NETWORK

BACKGROUND OF THE INVENTION

1. Technical Field

The invention relates to a method and device for transmitting information to a digital video broadcasting (DVB) network.

2. Discussion of Related Art

In the branch of TV technology, it is considered a fact that analogue TV transmissions will be to an increasing extent replaced by digital TV transmissions. This development is due to the remarkable advantages offered by digital TV transmissions compared to analogue transmission. These advantages include, for instance, better image and sound quality and more efficient use of the frequency band, which enables sending more TV channels than in analogue transmission, using the same bandwidth.

The first digital TV transmission equipment have already been in use for a few years. The European digital TV system is called Digital Video Broadcasting, defined by EBU (European Broadcasting Union) and ETSI (European Telecommunications Standards Institute). Very similar systems are being used in other parts of the world. In this application, all these digital TV systems are referred to by the term DVB. In these systems, one operator typically has a data transfer capacity of 30–40 Mbit/s at his disposal, and one TV channel typically takes 3–4 Mbit/s of this capacity. Thus one operator has about ten TV channels on the average. The fixed and variable costs of the operator are such that the costs per one TV channel still remain relatively high.

FIG. 1 is a schematic outline of the operation of prior art DVB equipment. The DVB operator 19 has made a contract with three information producers or transmitters 11a, 11b and 11c on certain information to be transmitted to the end users, which information can be, for instance, films, news or other information that can be sent to the DVB network 15. The producers or transmitters 11a, 11b and 11c send the information to the operator 19 typically by a separate medium, such as a video disc or an analogue tape.

When the operator 19 has received the information to be transmitted, he draws up a transmission schedule 13, in which he arranges the information received from different suppliers 11a; 11b; 11c in a suitable manner to the data transfer capacity at his disposal. When the operator 19 has arranged the information to be sent to the network 15, it inputs the information to the DVB server 14, in which the information is coded into an information stream in the form of a standard DVB transmission coding, such as MPEG2/S (Transport Stream). After this, the information stream is sent to the DVB network 15, from which the end user's terminal 18 receives the transmitted information stream, decodes its information content and presents it to the end user.

The problem of the prior art is, in addition to the high cost pressure on each channel mentioned above, the fact that when coding methods that consume a lot of data transfer capacity are used, the situation is often such that data transfer capacity is not used efficiently. According to FIG. 2, as much as 1–2 Mbit/s unused data transfer capacity may remain between the channels 21a, 21b, 21c and 21d. The data transfer capacity 22 that remains unused may be too narrow for sending the information stream contained in the new channel, and so part of the potential data transfer capacity of the operator remains unused.

According to a first aspect of the present invention, a method for transmitting information to a DVB network as an information stream from an information producer or transmitter to an operator of the DVB network for transmission to the DVB network, is characterized in that the producer or transmitter of the information sends the information to a well-known multicast internet address as internet protocol packets, and the operator receives the multicast internet protocol packets which contain the information from the internet.

The first aspect of the present invention, in which at least part of the transmission data of the information is transmitted from the producer of the information to the DVB operator, may be further characterized in that the information producer sends the transmission data of the information to be transmitted as packets according to the SAP/SDP protocol to a well-known multicast address in the internet, the DVB operator estimates the transmission data according to the SAP/SDP packet, and if he so desires, adds information according to the SAP/SDP packet to the IP/EPG database of the DVB/SAP server. The at least part of the information of the IP/EPG database may be coded into packets according to the SAP/SDP protocol, which may be further coded into packets according to the IP protocol and added to the information stream to be sent to the DVB network. The information of the received multicast IP packets contained in the information to be transmitted may be compared to the information to be transmitted may be compared to the information of the IP/EPG database.

According to a second aspect of the present invention, a device for transmitting information to a DVB network, which device has means for receiving the information to be transmitted, means for receiving the information to be transmitted, means for adding the received information to the information stream to be transmitted to the DVB network and means for transmitting the information stream to the DVB network, is characterized in that the device has means for receiving packets according to the multicast internet protocol. Such a device may have means for receiving SAP/SDP packets. It may further include means by which the SAP information transmitted by SAP/SDP packets coming from accepted source is updated to the IP/EPG database.

The method and device according to the invention can eliminate the problems of the prior art that were described above. It offers a cheaper solution for transmitting information to end users via the digital TV network, and at the same time enables sending more different information with the same data transfer capacity compared to the prior art. The lowering of the costs per channel improves the possibilities of small information producers to get data transfer capacity from the DVB network.

Furthermore, the invention has the advantage to the information producer that the information to be sent to the DVB network can be transmitted to the operator in real time by simple means, whereby the information producer can transmit real-time information to the DVB network, such as weather or traffic information at relatively low cost.

In addition to increased supply of information, the invention offers the operator the advantage of more efficient utilization of the data transfer capacity available, when the data transfer capacity that would otherwise remain unused can be taken into use.

The invention also has the advantage that one producer can send the same information simultaneously to a number of DVB operators, whereby the transmission costs per one operator can be reduced.

In addition, the method and device according to the invention make it possible for a DVB network user to select and receive multicast information in DVB networks that do not include a return channel.

The above advantages are achieved by increasing the number of channels available by using, instead of MPEG2 or a similar video coding method which is expensive but produces a very good image quality, a coding method, such as H.263+, which produces a slightly weaker image quality but requires less data transfer capacity. By using coding methods that require less data transfer capacity, information can be transmitted from the information producer to the DVB operator by using standardised protocols that comply with the Internet Protocol (IP) (e.g. multicast IP, UDP/RTP), which enables transmitting the information via Internet.

These and other objects, features and advantages of the present invention will become more apparent in light of the following detailed description of a best mode embodiment thereof, as illustrated in the accompanying drawing.

BRIEF DESCRIPTION OF THE DRAWINGS

In the following, the invention will be described in more detail with reference to the accompanying drawings, of which

FIGS. 1 and 2 have been dealt with above in connection with the prior art.

DETAILED DESCRIPTION OF PREFERRED EMBODIMENTS OF THE INVENTION

Figure 1:
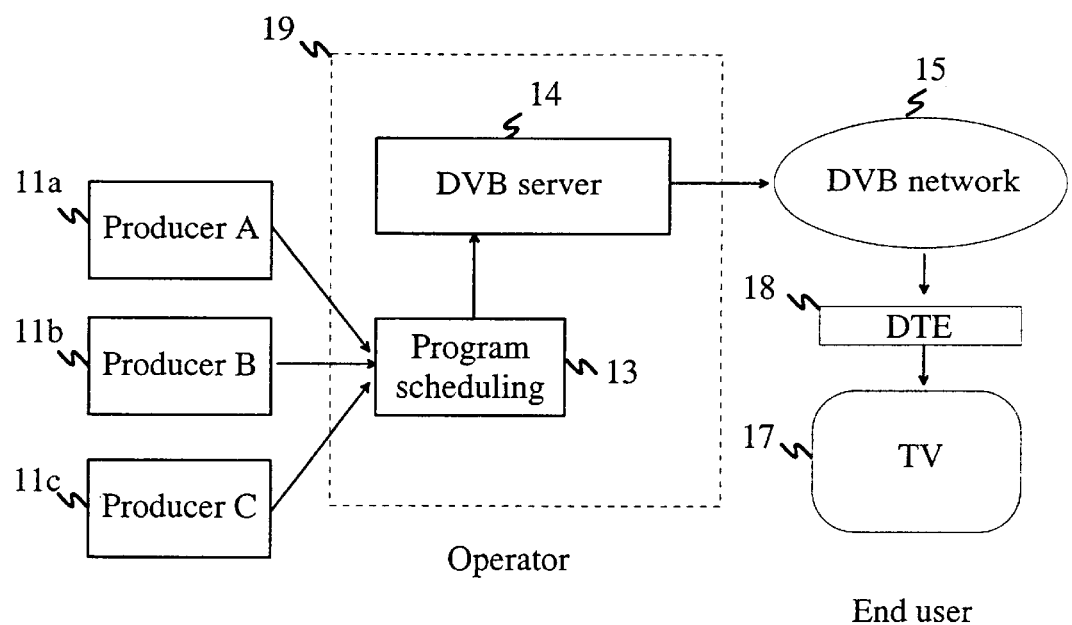
FIG. 1 shows a prior art DVB network.
Figure 2:
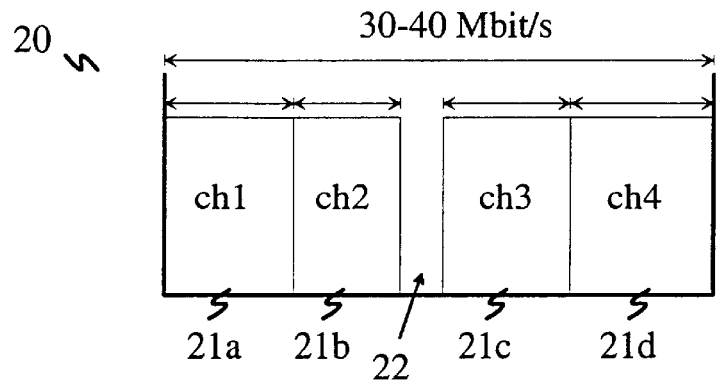
FIG. 2 shows the use of data transfer capacity according to the prior art.
Figure 3:
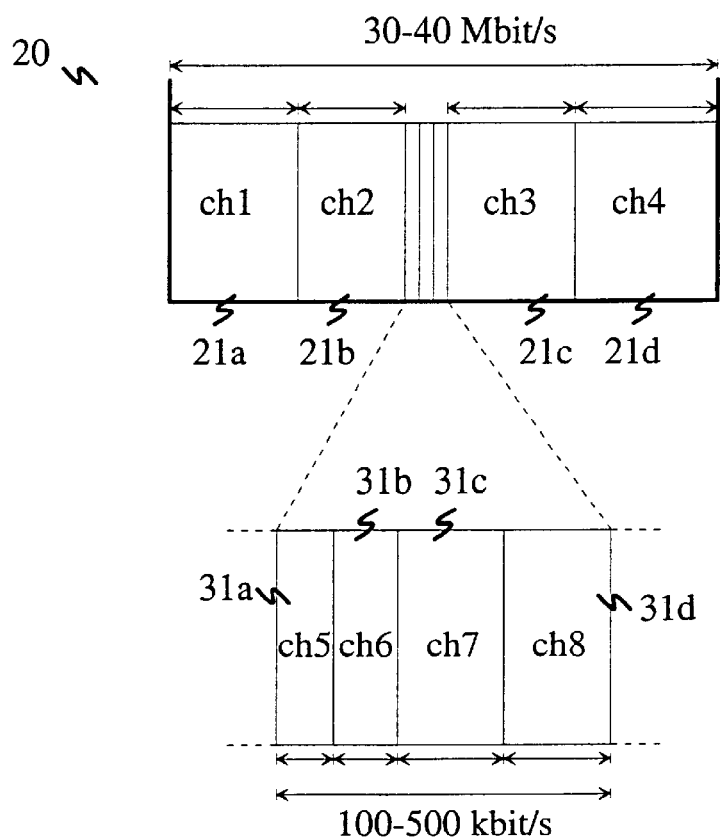
FIG. 3 shows the use of data transfer capacity according to one embodiment of the invention, FIG. 4 a solution according to the invention for transmitting information from the producer to an end user connected to the DVB network.

FIG. 3 shows a solution of the invention, by which the unused data transfer capacity that remained in the available data transfer band 20 between the primary channels 21a, 21b, 21c and 21d that require a high data transfer capacity can be taken into use by filling the data transfer band with secondary channels 31a, 31b, 31c and 31d that require less data transfer capacity. The primary channels 21a, 21b, 21c and 21d can comprise, for example, MPEG2-coded digital TV channels with very high image quality, and the secondary channels 31a, 31b, 31c and 31d can comprise H.263+-coded TV channels with slightly lower image quality or mainly numerical information transmitted e.g. by the local road service centre about the local traffic situation.

Figure 4:
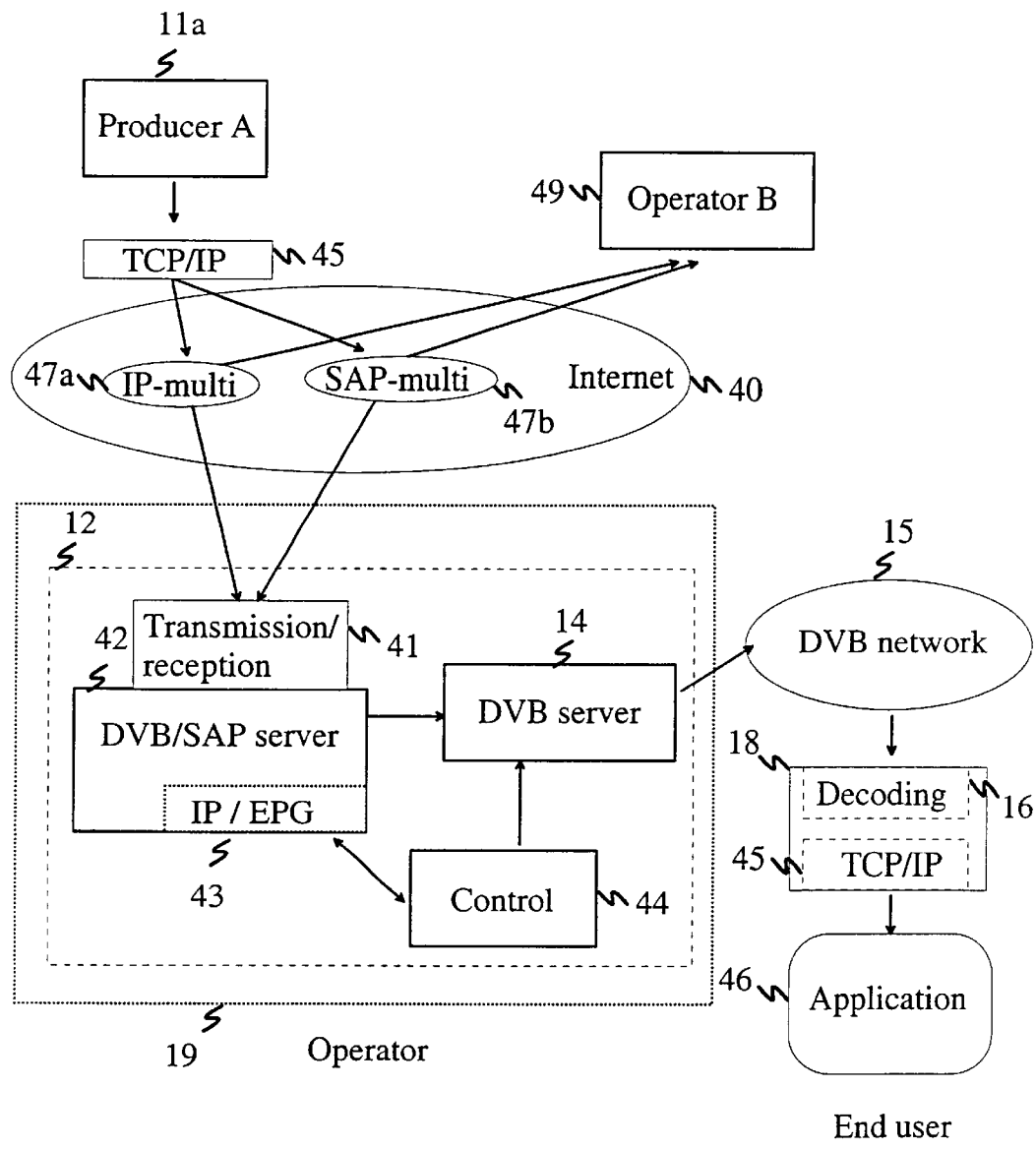

FIG. 4 shows a solution according to the information for transmitting information from the producer 11a via the operator 19 to the DVB network 15 and further to the end user. The producer 11a of the information or the transmitter, if the information was produced elsewhere, transforms the information into packets according to the multicast Internet protocol (IP) to be transmitted by the means 45 via Internet 40 to a well-known, logical multicast address 47a, from which the information is transmitted to DVB operators 19 and 49 connected to the same multicast address, of which operators there can naturally be one or more. In order to simplify the description, only one operator 19 is dealt with in the following.

The packets transmitted by the producer 11a to the operator 19 are preferably encrypted by a well-known method, such as IPsec or the like. Thus other operators than the one 19 that has made an agreement with the producer are prevented from decoding the information sent by the producer 11a.

The DVB operator 19 receives the IP packets sent by the producer 11a to Internet 40 by a transmitter/receiver unit 41 connected to Internet, which unit is also connected to the DVB/SAP (Digital Video Broadcasting/Session Announcement Protocol) [2] Server 42. The address of the sender of the received packet is compared to the data of the IP/EPG (Internet Protocol/Electronic Program Guide) database 43 that is contained in the DVB/SAP Server concerning the service providers that have a contract with the operator and the resources allocated to them. If the IP packet comes from a permitted transmitter and in other ways, such as temporally and in respect of its data transfer capacity requirements, corresponds to the information saved in the database, the DVB/SAP server transmits the IP packets that contain the information to the DVB server 14 to be coded as part of the information stream to be sent to the DVB network 15.

The DVB server 14 codes the IP packets received from the DVB/SAP server 42 preferably so that they become part of a standard DVB transmission coding, such as MPEG2 TS or the like. The DVB server 14 sends the DVB-coded information stream to the DVB network 15, from which the data terminal equipment 18 of the end user receives the information stream.

The end user's data terminal equipment 18 decodes the DVB-coded information stream with the decoding unit 16, whereby the IP packets contained in the stream can again be processed. The data terminal equipment 18 processes the IP packets in a well-known manner via the TCP/IP stack 45 to the selected application 46.

In order that the IP packets sent by the producer 11a would be transmitted to the DVB server, they must correspond to the data entered in the IP/EPG database 43 of the DVB/SAP server 42. For this reason, the producer 11a must in some way inform the operator 19 of the packets that he is going to send. This takes place by means of the SAP/SDP (Session Announcement Protocol/Session Description Protocol) [1] packet, which the service provider 11a sends to the well-known multicast address 47b intended for the DVB operators 19 and 49 or the public MBone (Multicast backbone) multicast address of Internet. SAP/SDP is preferably encrypted by using well-known methods.

The SAP/SDP packet contains a description of the information to be transmitted, the packet types to be transmitted and the transmission schedules, on the basis of which the operator 19 can decide whether he wants to transmit the information described to the DVB network 15 operated by him, and reserves the resources needed for this, if necessary. The SAP/SDP packet can contain, for example, information telling that the producer will send a certain sports event on a certain day at 5.00–6.00 p.m., the data stream of which transmission consists of a compressed audio signal, a compressed video signal, one data signal and two synchronizing signals.

Typically, the information producer 11a and the operator 19 have agreed in advance that the producer 11a may send his information to the operator 19. After this the operator 19 has added the information of the producer 11a (encryption keys etc.) to the IP/EPG database 43 of the DVB/SAP server 42, whereby the DVB/SAP server 42 can decode SAP/SDP packets sent by the producer 11a. However, a separate agreement is not necessary. If he so desires, the operator 19 can keep his DVB/SAP server open for all SAP/SDP packets coming from Internet by joining the public Mbone multicast address, whereby anyone can offer his information to the operator 19 via Internet 40. Via the control unit 44 connected to the DVB/SAP server 42, the operator 19 can select what he wants from the information provided and update to the IP/EPG database 43 the information he wants to be transmitted to the DVB server 14 and further to the DVB network 15.

In order that the end users of the DVB network would also know about the incoming programs and other information, the information that is essential for the end user, such as what information is available from the DVB network 15, at what time and to which IP multicast address the end user must be connected to be able to receive the desired information, must be transmitted to the end user. This information is sent by coding the SAP packet into the information stream to be sent to the DVB network 15 by using a well-known multicast address, as described above. Then, as was described above, the end user's data terminal equipment 18 decodes the SAP packet contained in the information stream and transmits it via the TCP/IP stack 45 to the desired application to be presented to the end user.

Figure 5:
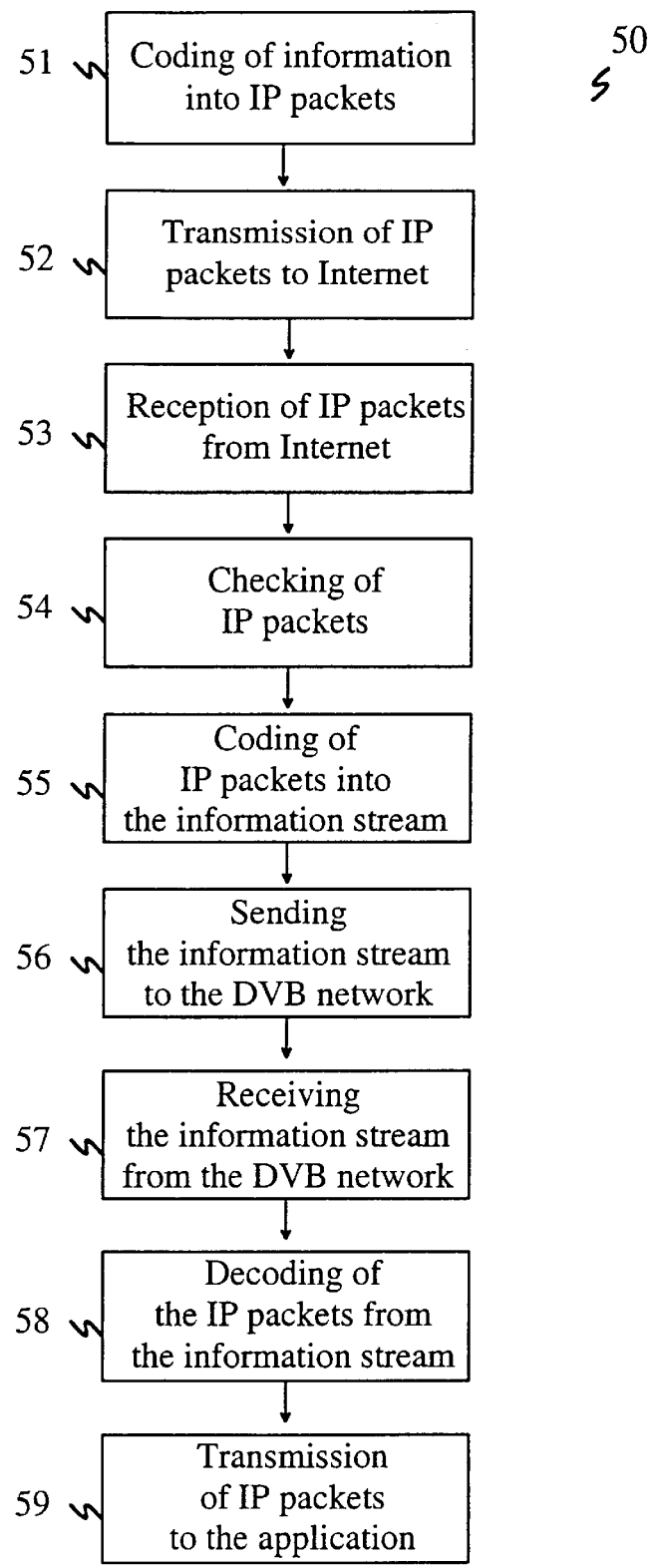
FIG. 5 shows a method according to the invention for transmitting information to the DVB network.

FIG. 5 shows a flow chart of an embodiment 50 of the invention for transmitting the information consisting of the service content from the information producer via the operator to the end user. In the first step 51 of method 50 the information producer or transmitter codes the information to be transmitted into packets that comply with the IP protocol. The information to be coded can, if desired, be encrypted using a well-known method, such as IPsec. In the second step 52 the packets are sent as an IP multicast transmission to Internet, from which they are received in the third step 53 either preferably directly by the DVB operator or by some third party, which transmits the IP packets to the operator. In order to receive the IP packets, the operator must join the IP multicast group announced by the transmitter by a SAP/SDP message.

In the fourth step 54 of the method, it is verified that the IP packets comply with the agreement, and the possible encryption is decoded using the IP/EPG database. In the fifth step 55, the accepted IP packets are coded into the information stream to be transmitted to the DVB network, which information stream is transmitted to the DVB network in the sixth step 56 using an IP multicast address announced in advance by a SAP/SDP message.

In the seventh step 57 of the method the data terminal equipment receives the information stream from the DVB network, and in the eighth step 58 decodes the IP packets from the information stream, which packets are then sent to the application in question via the TCP/IP stack in the ninth step 59.

Figure 6:
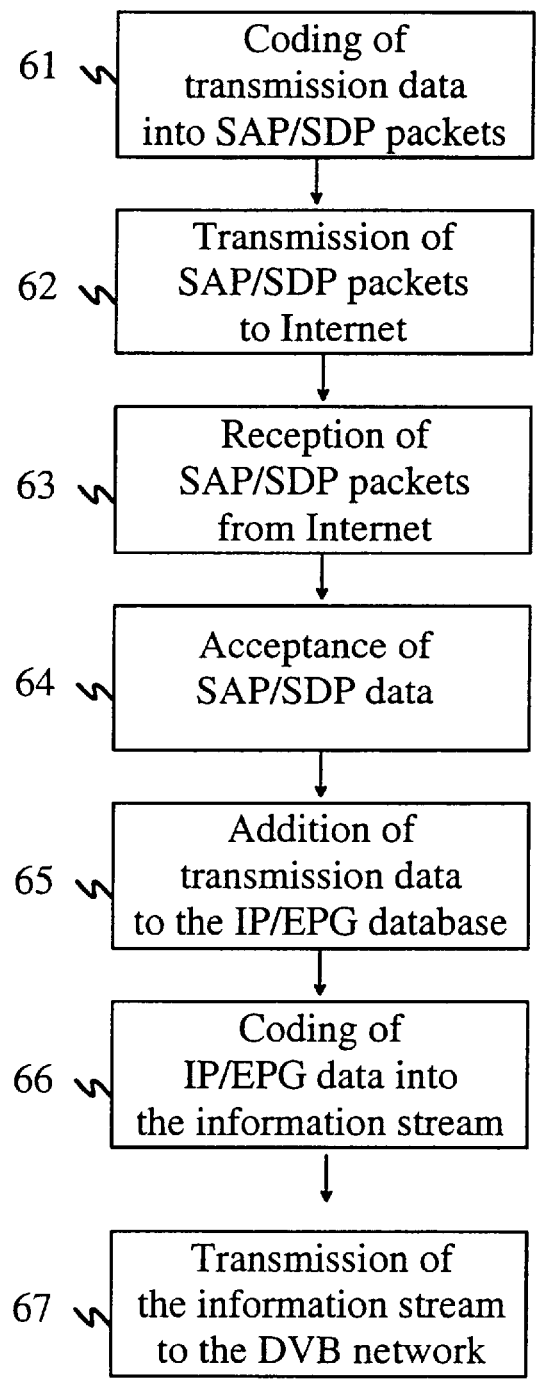
FIG. 6 shows a method according to the invention for sending the transmission data of the information to be transmitted from the producer to the operator and further to the DVB network.

FIG. 6 shows an embodiment 60 of the invention for sending the transmission data that describe the information to be transmitted. In the first step 61 of the method the transmission data are coded into SAP/SDP packets, which are in the second step 62 sent via Internet to the IP multicast group used by the DVB operators for this purpose. In the third step 63 of the method, the operator receives the SAP/SDP packets.

In the fourth step 64 of the method, the operator accepts the information which complies with the SAP/SDP data for transmission to the DVB network, and updates in the fifth step 65 of the method the information of the SAP/SDP packet to the IP/EPG database, so that the IP packets that contain the actual information to be transmitted can be accepted in the check according to the fourth step 54 of the method shown above in FIG. 5. In the sixth step 66 of the method, the information contained in the IP/EPG database is coded and provided so as to be transmitted in a seventh step 67 via the DVB network to the end user in the manner described above.

The solution according to the invention is not limited to the embodiments described above only, but the forms of implementation according to the invention can vary within the scope defined by the claims.

Furthermore, it is not necessary for the operator to utilize the received information himself, but he can send the information to his own DVB network 15 or transmit it to another DVB operator 49, either via Internet 40 or by other means. Although the invention has ben shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method for transmitting information to a digital video broadcasting network as an information stream which complies with digital video broadcasting standards, in which method the information is transmitted from an information producer or transmitter to an operator of the digital video broadcasting network to be sent to said digital video broadcasting network, the method comprising the producer or transmitter of said information sends said information to a well-known multicast address of an internet as packets which comply with an internet protocol, said operator receives the multicast internet protocol packets which contain said information from said internet, and said operator selects an information from said information stream to be transmitted to said digital video broadcasting network, encodes said selected information to comply with the digital video broadcasting standards and sends said selected information to said digital video broadcasting network.

2. A method according to claim 1, in which at least part of transmission data of said information is transmitted from said producer of said information to said digital video broadcasting operator, wherein said information producer sends the transmission data of the information to be transmitted as packets according to a session announcement protocol/session description protocol to a well-known multicast address in said internet, said digital video broadcasting operator receives said session announcement protocol/session description protocol packets, and said digital video broadcasting operator estimates the transmission data according to said session announcement protocol/session description protocol packets and, if he so desires, adds information according to said SAP/SDP packets to an internet protocol/electronic program guide database of a session announcement protocol/session description protocol server.

3. A method according to claim 2, wherein at least part of the information of said internet protocol/electronic program guide database is coded into packets according to said SAP/SDP protocol, which are further coded into packets according to the internet protocol and added to the information stream to be sent to said digital video broadcasting network.

4. A method according to claim 2, wherein the information of the received multicast internet protocol packets contained in said information to be transmitted are compared to the information of the internet protocol/electronic program guide database.

5. A device for transmitting information to a digital video broadcasting (network, which device has means for receiving the information in packets according to a multicast internet protocol, means for selectively adding the information based on predetermined criteria to an information stream for transmission to said digital video broadcasting network, for encoding said received information to comply with a digital video broadcasting standard and for transmitting the information stream to said digital video broadcasting network.

6. A device according to claim 5, wherein the device has means for receiving transmission data for said information as session announcement protocol/session description protocol packets, said means for receiving the information as the session announcement protocol/session description protocol packets can be optionally combined with the means for receiving the information in packets according to the multicast internet protocol.

7. A device according to claim 6, wherein the device has means for maintaining an internet protocol/electronic program guide database.

8. A device according to claim 7, wherein the device has means by which session announcement protocol information transmitted by said session announcement protocol/session description protocol packets from accepted sources is updated to the internet protocol/electronic program guide database.

9. A method according to claim 3, wherein the information of the received multicast internet protocol packets contained in said information to be transmitted are compared to the information of the internet protocol/electronic program guide database.

10. Apparatus for transmitting information to a digital video broadcasting network, comprising:
   a receiver for receiving said information in the form of packets according to a multicast internet protocol;
   a first server responsive to said received information for receiving session announcement protocol/session description protocol packets from said receiver; and
   a digital video broadcasting server responsive to said received information for transmitting the information to the digital video broadcasting network in compliance with digital video broadcasting standards.

11. The apparatus of claim 10, wherein said server for receiving the session announcement protocol/session description protocol packets has means for maintaining an internet protocol electronic program guide database.

12. The apparatus according to claim 11, wherein said server for receiving the session announcement protocol/session description protocol packets updates SAP information from accepted sources to the internet protocol/electronic program guide database.

13. The apparatus of claim 10, further comprising a controller, responsive to said SAP/SDP packets from said server, for providing a control signal, wherein said first server is responsive to said control signal for controlling said transmitting the information to the digital video broadcasting network.

14. A method for transmitting information to a digital video broadcasting network, in which method the information is transmitted from an information producer to an operator of the network for sending said information to the network, the method comprising the steps of:
   sending from the producer or transmitter said information to an internet multicast address as packets with an address,
   receiving the packets which contain said information with the address at the operator,
   maintaining an internet protocol/electronic program guide database at the operator based on said packets, and
   selecting information from said received information to be transmitted to said digital video broadcasting network, encoding said selected information to comply with digital video broadcasting standards and sending said selected information to said digital video broadcasting network.

15. A method for transmitting information to a digital video broadcasting network, the method comprising the steps of:
   transmitting said information from an information producer or transmitter to a multicast address as packets in accordance with a multicast internet protocol,
   receiving said packets at an operator of the network for sending said information to the network,
   maintaining an internet protocol/electronic program guide database at the operator based on said packets, and
   selecting information from said received information to be transmitted to said digital video broadcasting network, encoding said selected information to comply with digital video broadcasting standards and sending said selected information to said digital video broadcasting network.

16. A method for transmitting information to a digital video broadcasting network, in which method the information is transmitted from an information producer to an operator of the network for sending said information to the network, the method comprising the steps of:
   sending from the producer or transmitter said information as packets to a multicast internet address,
   receiving the packets which contain said information with the address at the operator,
   maintaining an internet protocol/electronic program guide database at the operator, and
   selecting information from the said received information to be transmitted to said digital video broadcasting network, encoding said selected information to comply with digital video broadcasting standards and sending said selected information to said digital video broadcasting network.

* * * * *